United States Patent [19]
Burton et al.

[11] Patent Number: 5,320,578
[45] Date of Patent: Jun. 14, 1994

[54] HOUSING FOR A ROTATABLE SHAFT

[75] Inventors: Edward J. Burton, North Dandenong; Ronald T. Knaggs, Narre Warren, both of Australia

[73] Assignee: Trico Products Corporation, Buffalo, N.Y.

[21] Appl. No.: 871,391

[22] Filed: Apr. 21, 1992

[51] Int. Cl.⁵ .......................... F16C 1/26; A47L 1/00; F16J 15/34
[52] U.S. Cl. ................................ 464/170; 15/250.34; 277/95; 277/81 R
[58] Field of Search .................. 464/170, 185; 277/12, 277/81 R, 237 R, 52, 212 R, 212 C, 95; 15/250.30, 250.34, 250.36, 250.32

[56] References Cited
U.S. PATENT DOCUMENTS

| | | | |
|---|---|---|---|
| 3,790,985 | 2/1974 | Kessler | 15/250.34 |
| 4,311,315 | 1/1982 | Kronenberg | 277/95 |
| 4,550,469 | 11/1985 | Deutscher et al. | 15/250.34 |
| 5,067,198 | 11/1991 | Ishikawa et al. | 15/250.34 |

FOREIGN PATENT DOCUMENTS

| | | | |
|---|---|---|---|
| 491603 | 6/1992 | European Pat. Off. | 15/250.34 |
| 1579347 | 8/1969 | France | 15/250.34 |
| 1498851 | 8/1989 | U.S.S.R. | 277/152 |
| 1212715 | 11/1970 | United Kingdom | 277/95 |

Primary Examiner—Clifford D. Crowder
Assistant Examiner—Bibhu Mohanty
Attorney, Agent, or Firm—Joseph G. Nauman

[57] ABSTRACT

This invention relates to a housing for a rotatable shaft, particularly one used in the drive mechanism of a windscreen wiper assembly. The housing comprises a body portion having first and second ends disposed oppositely to and axially remote from each other, the body portion being provided with an integrally formed retaining member adapted to maintain the axial positioning of the rotatable shaft. Another embodiment of the invention provides on the second end of housing means for biasingthe body portion in the axial direction.

2 Claims, 2 Drawing Sheets

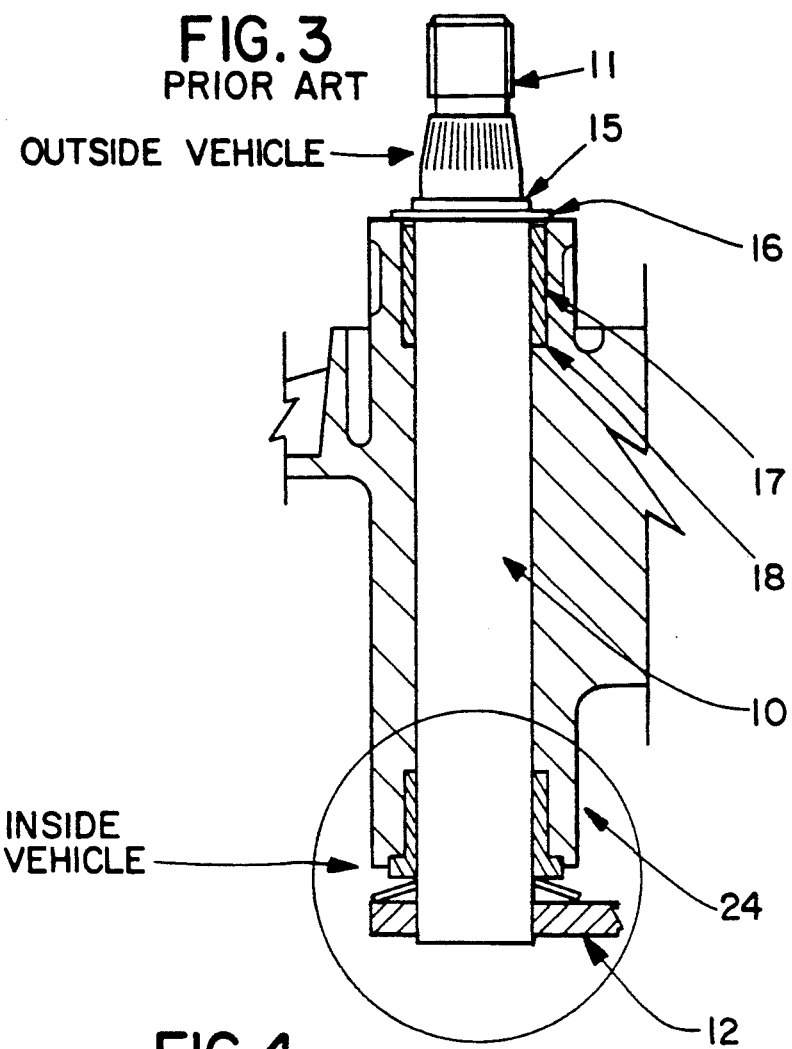
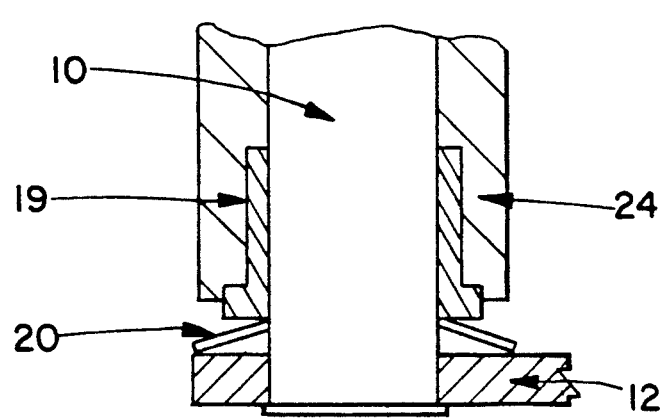

HOUSING FOR A ROTATABLE SHAFT

FIELD OF THE INVENTION

This invention relates to a housing for a rotatable shaft which is particularly, but not exclusively useful in the manufacture of the drive mechanism for windscreen wipers.

BACKGROUND OF THE INVENTION

In conventional windscreen wipers, between the main wiper arm and the lever driving the wiper arm, there exists a drive shaft which oscillates so as to transfer the motion of the lever to the wiper arm. Generally, this drive shaft is surrounded by a housing supporting it in the surrounding vehicle panel. In fact, this housing is part of a pivot assembly comprising a plurality of parts required to support, seal and allow rotation of the drive shaft. Where the drive shaft is operably connected to the driving lever inside the vehicle, at a first end, a bearing is provided. Additionally, a bearing is provided where the wiper arm is operably connected to the drive shaft outside the vehicle at a second end of the assembly. The assembly at this second end of the drive shaft also includes a sealing 'O' ring, a thrust bearing washer and a circlip. In order to take up the length tolerances and to bias the pivot assembly towards the 'O' ring seal to prevent water ingress, at the first lever end of the shaft there is also provided a wave washer. In totality, 7 parts make up a conventional pivot assembly for drive shafts of this type.

A typical arrangement of this type is illustrated in FIGS. 3 and 4, wherein the drive shaft 10 is supported in a housing 24 in the surrounding vehicle panel and connects the upper end of shaft on the outside of the vehicle to the wiper arm 11 and the lower end of the shaft on the inside of the vehicle to a lever 12 providing oscillating movement to the drive shaft. At this lower end of the shaft a bearing 19 is provided. Another bearing 18 is also provided at the upper end of the shaft on the outside of the vehicle. At this upper end of the drive shaft a sealing 'O' ring (not shown) is also provided as well as a thrust bearing washer 16 and a circlip 15. Typically, the neck portion 17 of housing 24 protrudes through a hole in the vehicle cowl. To take up the length tolerances at the lower end of the shaft, inside the vehicle, a wave washer 20 is provided.

The manufacture of assemblies of the type described is complicated due to the large number of parts required and is therefore difficult to automate. A further disadvantage is that these assemblies, due to their intricacy, are also expensive to produce.

SUMMARY OF THE INVENTION

Accordingly, it is the objective of this invention to provide a pivot assembly which ameliorates at least some of the disadvantages of the prior art. In particular, it is an objective to provide an assembly which is easier and faster to manufacture and assemble.

To this end, there is provided housing for a rotatable shaft comprising a body portion having first and second ends disposed oppositely to and axially remote from each other, said body portion being provided with an integrally formed retaining member adapted to maintain axial positioning of said rotatable shaft.

This invention is predicated upon the surprising discovery that by the use of an integrally formed retaining member, the rotatable shaft is retained in place in the pivot assembly, the rotatable shaft can be sealed against water ingress and the need for a thrust bearing washer is averted. Conveniently, at least 3 parts of the prior art assembly are avoided and therefore the ease and speed of assembly can be improved.

Preferably, the integrally formed retaining member is located at or adjacent the first end of the housing. More conveniently, the integrally formed retaining member is an inwardly extending lip.

In a preferred aspect of the invention, the housing also forms a bearing surface and thus the need for a separate bearing in the assembly is averted and the speed and ease of assembly is proportionately increased again.

More preferably, the integrally formed retaining member forms in cross-section a frusto-conically shaped extension of the body portion of the housing and is therefore particularly well adapted to retain the rotating shaft in position at the same time forming a seal against ingress of foreign matter.

In order to maximize ease and speed of assembly, a particularly preferred form of the invention is that in which the frusto-conically shaped extension of the housing is resilient so as to allow the rotatable shaft to be snap fitted without damage to the housing.

In an alternative embodiment of this invention, the frusto-conically shaped inwardly extending lip may be radially segmented to allow ease of assembly. In this embodiment, it is necessary to use, in adjunct with the housing, an 'O' ring seal, since the radially segmented lip on the housing cannot seal the rotatable shaft against ingress by foreign matter.

In another aspect of this invention, there is provided housing for a rotatable shaft comprising a body portion having first and second ends disposed oppositely to and axially remote from each other, and means for biasing said body portion in an axial direction being provided at or adjacent said second end.

The provision of the biasing means at or adjacent the second end of the body portion of the housing very conveniently obviates the necessity of having a separate wave washer to ensure that a seal is made at the axial edge of the second end of the assembly remote from said second axial edge and, in a manner similar to that outlined hereinabove, the decrease in the number of parts in the assembly correlates to an increase in the efficiency of manufacture of assemblies of this type.

In a preferred form of this aspect of the invention, the biasing means is formed integrally with the body portion of the housing.

More preferably the integrally formed biasing means takes the form of a disc spring.

Most conveniently, it is possible for the housing provided on its body portion with an integrally formed disc spring to also form a bearing surface for the rotatable shaft and thus the number of parts in the assembly is still further reduced.

In a further aspect of this invention, there is provided housing for a rotatable shaft comprising a body portion having first and second ends disposed oppositely to and axially remote from each other, said body portion being provided with an integrally formed retaining member adapted to maintain axial positioning of said rotatable shaft and said second end of said body portion having at or adjacent said second end, means for biasing said body portion in an axial direction.

In a preferred form of this aspect of the invention, the biasing means is formed integrally with said body portion. It can be seen, that in this aspect of the invention, the multiplicity of parts which constitute the assembly of the prior art are replaced by a single housing thereby allowing greatest ease of manufacture.

Preferably the housing of this aspect of the invention also forms a bearing surface or surfaces for the rotatable shaft.

In particular, in this aspect of the invention, the integrally formed retaining member at or adjacent a first end of the housing is frusto-conical in cross-section and snap fits onto said rotatable shaft by virtue of it being resilient.

Most preferably the integrally formed biasing means at or adjacent the second end of the housing, being remote from said first end, takes the form of a disc spring so as to bias said housing towards said first end of said body portion. In this way, when the housing is located on a rotatable shaft, pressure is exerted on said first end by said biasing means on said second end thereby ensuring said first end seals the rotatable shaft against ingress by foreign matter.

In yet another aspect of the invention there is provided housing for a rotatable drive shaft of a windscreen wiper assembly being adapted to operably link a drive lever to a main arm of said windscreen wiper assembly, said housing comprising a body portion having first and second ends disposed oppositely to and axially remote from each other, said body portion being adapted to cooperate at said first end with said main arm of said windscreen wiper assembly and at said second end with said drive lever, and being provided at or adjacent said first end with an integrally formed retaining member adapted to maintain axial positioning of said rotatable drive shaft, and at or adjacent said second end with means for biasing said body portion in an axial direction.

BRIEF DESCRIPTION OF THE DRAWINGS

FIG. 3 is a sectional view of a typical prior art housing for a windshield wiper drive shaft.

FIG. 4 is and enlarged view of the lower (encircled) portion of FIG. 3.

DESCRIPTION OF PREFERRED EMBODIMENT

Figure 1:
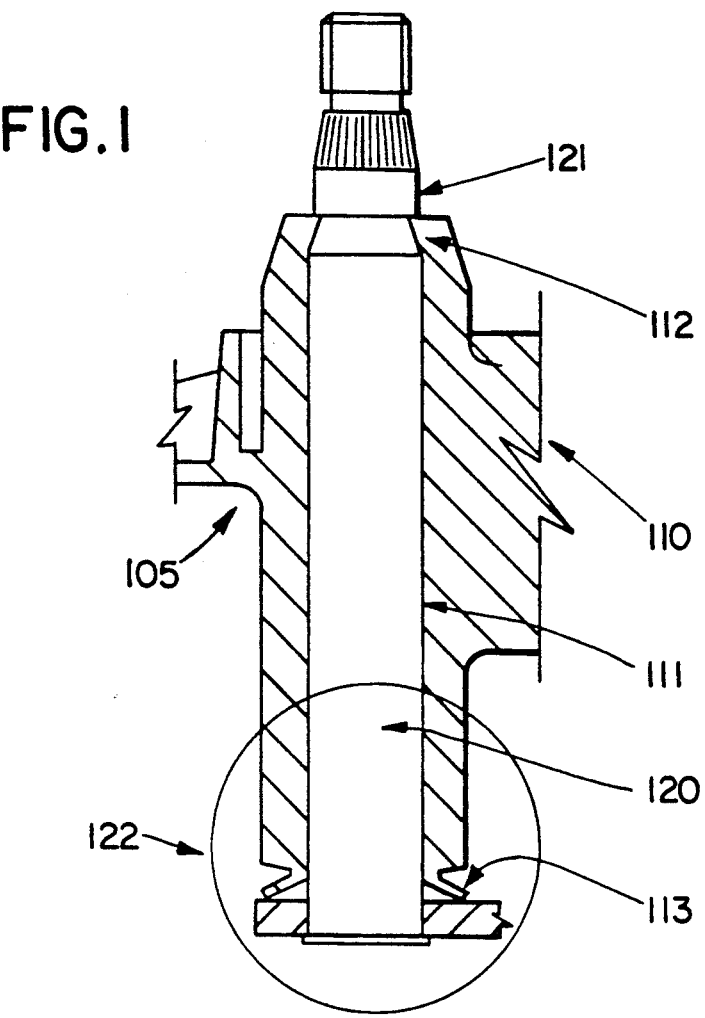
FIG. 1 is a sectional view of the housing of the invention on a rotatable shaft.
Figure 2:
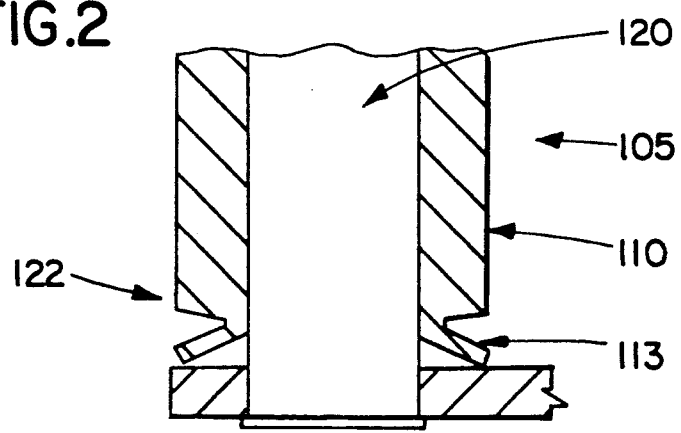
FIG. 2 is an exploded view of the lower portion of FIG. 1 indicated.

The housing 105 has a body portion 110 with a central bore 111, which is provided on a first end 121 with an inwardly extending lip 112 which forms a frusto-conical shape in cross-section and is resilient so as to allow the housing to be snap fitted to the rotatable shaft 120 which is rotated or oscillated within the bearing surface provided by central bore 111, by the attached lever 121. On the second end 122 of the housing which is remote from the first end, a biasing means 113 is provided in the form of a disc spring. This disc spring, integral with the body portion of the housing, enables the housing to be axially biased towards the first end where the biasing results in the frusto-conical shaped lip 112 forming an effective seal against ingress by foreign matter between the housing and the rotatable shaft. The disc spring shaped biasing means of the housing is thus an integral part of the drive mechanism of a windscreen wiper or the like.

It can be seen that this integrally formed housing which has a dual function as a bearing has advantages over the pivot assemblies of the prior art inasmuch as the multiplicity of parts formerly required to house and seal the rotatable shaft of the drive mechanism of a windscreen wiper in place is replaced by a single housing which is self-retaining in the windscreen wiper assembly and easy and fast to manufacture and assemble.

It will be appreciated that various modifications may be made to the above described embodiments without departing from the scope of the invention.

While the invention has been described with particular reference to the drive mechanism of windscreen wipers, it is to be understood that the invention is not limited to the windscreen wiper field but may also be applied to situations in which a similar housing is required.

We claim:

1. A housing for supporting a rotatable drive shaft of a windshield wiper assembly in a vehicle, the shaft being adapted to provide rotational movement to a main arm of the windshield wiper assembly, said housing including a body portion having first and second ends disposed oppositely to and axially remote from each other, a central bore extending through said housing from said first end to said second end, an inwardly extending lip at said first end of said body portion having an interior surface including an entry diameter equal to the diameter of said central bore and a smaller exit diameter, said interior surface defining a generally frusto-conical shape in cross-section and being coaxial with said bore, said lip being temporarily expandable at said exit diameter, a drive shaft rotatably supported in said central bore and having a driving end adapted for engagement with an arm of a windshield wiper assembly, said driving end extending outward from said first end of said housing and having a lesser diameter than said exit diameter of said lip, said drive shaft having an undercut portion thereon adjacent said driving end and shaped to interfit with said interior surface of said lip whereby said drive shaft can be inserted through said bore and said driving end moved through said expandable exit diameter of said lip to interlock said drive shaft to said housing and to provide rotatable bearing support for said drive shaft.

2. The combination defined in claim 1, further including means for biasing said undercut portion of said drive shaft into engagement with said lip, said means for biasing including a disc spring integrally formed on said second end of said body portion of said housing.

* * * * *